(12) United States Patent
Krause et al.

(10) Patent No.: US 12,510,031 B2
(45) Date of Patent: Dec. 30, 2025

(54) APPARATUS AND PROCESS FOR STARTING UP AND SHUTTING DOWN A FEED OF FUEL FOR A TURBINE APPARATUS

(71) Applicant: Air Products and Chemicals, Inc., Allentown, PA (US)

(72) Inventors: Bryan Michael Krause, Allentown, PA (US); Louis J. Katogir, Cherry Hill, NJ (US); Ghassan Altimany, North Wales, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 18/776,652

(22) Filed: Jul. 18, 2024

(65) Prior Publication Data

US 2025/0043736 A1 Feb. 6, 2025

Related U.S. Application Data

(60) Provisional application No. 63/530,757, filed on Aug. 4, 2023.

(51) Int. Cl.
*F02C 9/26* (2006.01)
*F02C 3/22* (2006.01)
*F02C 7/232* (2006.01)
*F02C 7/26* (2006.01)
(Continued)

(52) U.S. Cl.
CPC .............. *F02C 9/26* (2013.01); *F02C 3/22* (2013.01); *F02C 7/232* (2013.01); *F02C 7/26* (2013.01); *F02C 9/40* (2013.01); *F23R 3/36* (2013.01); *F05D 2260/85* (2013.01)

(58) Field of Classification Search
CPC ...... F02C 9/40; F02C 9/26; F02C 7/22; F02C 7/232; B64D 37/32; F23R 3/36; F05D 2260/85
See application file for complete search history.

(56) References Cited

U.S. PATENT DOCUMENTS 6,752,620 B2   6/2004 Heier et al.
7,921,651 B2 * 4/2011 Alexander ............... F23R 3/36
                                                    60/776

(Continued)

FOREIGN PATENT DOCUMENTS

CN   113175384 A * 7/2021 ............... F02C 7/22
CN   115163309      10/2022
CN   116335834      6/2023

*Primary Examiner* — Alain Chau
(74) *Attorney, Agent, or Firm* — DaLesia H. Boyd; Jason M. Ploeger (57) ABSTRACT

An apparatus can be arranged and configured so that after a gas turbine is shut down due to a detected condition, a higher autoignition temperature fuel can be utilized to purge a fuel delivery system and facilitate a quicker restart of the turbine. Embodiments can utilize conduits, valves, and a control system for detection of a fault condition warranting a shut down, purging of a lower autoignition temperature fuel via venting and use of a higher autoignition temperature fuel for purging to facilitate subsequent restarting of the turbine. Embodiments can be configured so an inert gas purge is not needed for venting and purging of the fuel delivery system.

20 Claims, 4 Drawing Sheets

(51) Int. Cl.
*F02C 9/40* (2006.01)
*F23R 3/36* (2006.01)

(56) References Cited

U.S. PATENT DOCUMENTS

| | | | | |
|---|---|---|---|---|
| 8,261,529 B2* | 9/2012 | Koizumi | F23R 3/36 |
| | | | 60/39.463 |
| 8,340,886 B2* | 12/2012 | Nenmeni | F02C 9/40 |
| | | | 60/746 |
| 8,438,830 B2* | 5/2013 | Lawson | F02C 3/28 |
| | | | 60/734 |
| 11,592,178 B2 | 2/2023 | D'Agostini et al. | |
| 11,760,502 B2* | 9/2023 | Palmer | F02C 7/222 |
| | | | 60/39.281 |
| 12,078,108 B2* | 9/2024 | Minas | F02C 3/22 |
| 12,092,036 B2* | 9/2024 | Feher | F02C 3/22 |
| 12,215,637 B2* | 2/2025 | Suleiman | F02C 9/40 |
| 2009/0025396 A1* | 1/2009 | Joshi | F02C 7/22 |
| | | | 60/773 |
| 2009/0223226 A1* | 9/2009 | Koizumi | F02C 7/222 |
| | | | 60/737 |
| 2009/0272096 A1* | 11/2009 | Lawson | F02C 7/222 |
| | | | 60/39.463 |
| 2009/0272097 A1* | 11/2009 | Lawson | F02C 7/222 |
| | | | 60/39.463 |
| 2009/0272118 A1* | 11/2009 | Alexander | F02C 9/40 |
| | | | 60/39.463 |
| 2011/0126545 A1* | 6/2011 | Loeven, II | F23R 3/36 |
| | | | 60/39.281 |
| 2011/0154802 A1* | 6/2011 | Joshi | F02C 7/22 |
| | | | 60/39.281 |
| 2012/0232768 A1* | 9/2012 | Nenmeni | F02C 7/232 |
| | | | 701/99 |
| 2013/0127163 A1 | 5/2013 | Palamara et al. | |
| 2013/0186057 A1* | 7/2013 | Shanmugam | F23R 3/36 |
| | | | 60/776 |
| 2014/0283524 A1* | 9/2014 | Li | F23R 3/36 |
| | | | 60/776 |
| 2016/0177878 A1* | 6/2016 | Montagne | F02C 7/232 |
| | | | 60/779 |
| 2017/0254270 A1* | 9/2017 | Okada | F23R 3/36 |
| 2017/0298838 A1* | 10/2017 | Sathyakumar | F02C 3/04 |
| 2022/0268444 A1 | 8/2022 | D'Agostini et al. | |
| 2023/0092811 A1* | 3/2023 | Palmer | F02C 3/22 |
| | | | 60/39.281 |
| 2023/0228217 A1* | 7/2023 | Frey | F02C 9/40 |
| | | | 415/1 |
| 2023/0340915 A1* | 10/2023 | Speak | B64D 27/10 |
| 2023/0392551 A1* | 12/2023 | Minas | F02C 9/40 |
| 2024/0077038 A1* | 3/2024 | Barve | F02C 7/222 |
| 2024/0084743 A1* | 3/2024 | Suleiman | F02C 9/40 |
| 2024/0209790 A1* | 6/2024 | Feher | F02C 3/22 |
| 2024/0240594 A1* | 7/2024 | Asao | F02C 7/222 |
| 2024/0410585 A1* | 12/2024 | Shiraiwa | F02C 9/40 |

\* cited by examiner

APPARATUS AND PROCESS FOR STARTING UP AND SHUTTING DOWN A FEED OF FUEL FOR A TURBINE APPARATUS

CROSS-REFERENCE TO RELATED APPLICATIONS

The present application claims priority to U.S. Provisional Patent Application No. 63/530,757 filed on Aug. 4, 2023.

FIELD

The present innovation relates to processes and apparatuses for starting up and shutting down turbine operations (e.g. gas turbine operations).

BACKGROUND OF THE INVENTION

Gas turbines can combust a fuel to generate work or power. Examples of different types of gas turbines and arrangements for gas turbines can be appreciated from U.S. Pat. Nos. 11,592,178, and 6,752,620 and U.S. Patent Application Publication Nos. 2022/0268444 and 2013/0127163.

SUMMARY OF THE INVENTION

We determined that gas turbine arrangements can often require a significant amount of inert fluid (e.g. a non-oxidant containing gas such as nitrogen, argon, or dry carbon dioxide that can be non-combustively reactive with the fuel) for purging the turbine fuel and combustion system components in response to a safety alert condition being tripped to help avoid autoignition from occurring outside of a combustor of the turbine system. We determined that this type of issue can be particularly acute in turbine arrangements that utilize hydrogen as a primary fuel source (e.g. hydrogen fuel, refinery off gas (ROG), that can include 70 mole percent (mol %) to 90 mol % hydrogen with other heavy hydrocarbons, etc.). In some situations, the amount of inert fluid that may need to be stored for use in such a safety condition can be substantial and can delay resolution of a safety condition, which can prolong the delay in re-starting of the turbine engine. We determined that a new purge system arrangement can be provided that can reduce these types of delays and also reduce the amount of inert fluid that may need to be stored for addressing such situations. In some embodiments, the inert fluid storage can be reduced by 50% to 70% and the delay in restarting a turbine engine can be reduced by 20 minutes to 35 minutes (e.g. 30 minutes).

In a first aspect, an apparatus for starting up and shutting down a feed of fuel for a turbine apparatus is provided. The apparatus for starting up and shutting down a feed of fuel for a turbine apparatus can include a conduit arrangement having at least one low autoignition temperature fuel feed conduit connectable to at least one source of a low autoignition temperature fuel and a high autoignition temperature fuel feed conduit connectable to a source of a high autoignition temperature fuel. The conduit arrangement can be connectable to a combustion system and configured such that in response to a detected trip condition, at least one valve assembly of at least one vent conduit of the conduit arrangement is adjustable to an open position for venting while at least one valve assembly of the at least one low autoignition temperature fuel feed conduit is in a closed position to isolate the at least one source of the low autoignition temperature fuel and at least one valve assembly of the high autoignition temperature fuel feed conduit is also in a closed position to vent the conduit arrangement and the at least one valve assembly of the high autoignition temperature fuel feed conduit is openable while the at least one valve assembly of the at least one low autoignition temperature fuel feed conduit is maintained in the closed position to purge the conduit arrangement upstream of the combustion system and re-pressurize the conduit arrangement with the high autoignition temperature fuel to facilitate restarting of the turbine apparatus.

The detected trip condition can be any of a number of different conditions that can meet a pre-selected trip condition criteria. Such a trip condition can be based on temperature and/or pressure levels that exceed a pre-selected operational temperature level and/or pre-selected operational pressure level. A pre-defined trip condition can also be detected based on other criteria (e.g. oxygen concentration levels, type of fuel being combusted, high vibration or other mechanical malfunction, etc.). The pre-defined trip condition can also be a normal shutdown of the turbine apparatus (e.g. via operator input that actuates a normal shutdown of operation of the turbine apparatus).

In a second aspect, the conduit arrangement of the apparatus for starting up and shutting down a feed of fuel for a turbine apparatus can include other elements. For instance, the conduit arrangement can include a mixer and/or a fuel cleaning device. The mixer can be positioned between the fuel cleaning device and the at least one low autoignition temperature fuel feed conduit and the mixer can also be positioned between the fuel cleaning device and the high autoignition temperature fuel feed conduit. The fuel cleaning device can include a coalescer, a particulate removal device and/or liquid droplet removal device for cleaning gaseous fuel so it is suitable for combustion within a combustion system. In some embodiments, the conduit arrangement can include a fuel cleaning device feed conduit positioned between the mixer and the fuel cleaning device and a combustion system feed conduit connected between the fuel cleaning device and the combustion system.

In a third aspect, the conduit arrangement can also include a valve assembly of the combustion system feed conduit that is adjustable to a closed position in response to the detected trip condition. This valve assembly can also be adjustable from its closed position to an open position to facilitate the flow of fuel into the combustion system.

In a fourth aspect, the apparatus for starting up and shutting down a feed of fuel for a turbine apparatus can include a distributed control system controller communicatively connectable to different valve assemblies (e.g. valve assemblies of the conduit arrangement). For example, the distributed control system controller can be communicatively connected to the valve assembly of the combustion system feed conduit, the at least one valve assembly of at least one vent conduit, the at least one valve assembly of the at least one low autoignition temperature fuel feed conduit and the at least one valve assembly of the high autoignition temperature fuel feed conduit. The distributed control system controller can also be communicatively connected to a controller or other type of computer device that can be configured to oversee turbine apparatus operations or control the engine performance of the turbine apparatus.

In a fifth aspect, the apparatus for starting up and shutting down a feed of fuel for a turbine apparatus can include a source of inert fluid connectable to the combustion system via at least one inert fluid connection conduit positioned between the combustion system and the source of the inert fluid. The source of the inert fluid can include a tank that stores a cryogenic fluid (e.g. liquid nitrogen), which can be connected to a vaporizer and a buffer tank for vaporization of the cryogenic fluid for feeding inert gas to the combustion system via one or more inert fluid connection conduits. In other embodiments, the source of inert fluid can include at least one storage tank positioned to retain a fluid comprised of nitrogen or other inert fluid that is non-combustible with the fuel (e.g. argon, dry carbon dioxide, etc.).

In a sixth aspect, the apparatus for starting up and shutting down a feed of fuel for a turbine apparatus can be provides so that at least one inert fluid connection conduit positioned to feed an inert fluid (e.g. an inert gas or a gas that is not combustively reactive with fuel) to the combustion system has at least one valve assembly. For example, at least one inert fluid connection conduit can be configured to feed a gas that is non-combustively reactive (e.g. nitrogen gas, dry carbon dioxide gas, argon, etc.) to a combustion chamber of the combustion system.

In some embodiments, the combustion system can include, for example, a compression section, an exhaust section, a combustion chamber, and a rotatable shaft. In some embodiments, the combustion system can be configured to receive a feed of oxidant for combustion within a combustion chamber of the combustion system. The oxidant can be mixed with the fuel in the combustion chamber for combustion of the fuel, for example.

In a seventh aspect, at least one source of low autoignition temperature fuel can include a source of hydrogen and/or a source of refinery off gas (ROG). At least one low autoignition temperature fuel feed conduit can include a hydrogen feed conduit connectable to the source of hydrogen and/or a ROG feed conduit connectable to the source of ROG. At least one valve assembly of at least one low autoignition temperature fuel feed conduit can include a valve assembly of the hydrogen feed conduit and/or a valve assembly of the ROG feed conduit.

In an eighth aspect, the apparatus for starting up and shutting down a feed of fuel for a turbine apparatus of the first aspect can include one or more features of the second aspect, third aspect, fourth aspect, fifth aspect, sixth aspect and/or seventh aspect to form yet other embodiments. It should therefore be understood that other embodiments of the apparatus for starting up and shutting down a feed of fuel for a turbine apparatus can include other features, including features discussed in the exemplary embodiments of the turbine apparatus discussed herein.

In a ninth aspect, a process for starting up and shutting down a feed of fuel for a turbine apparatus can include one or more process steps. For example, the process can include shutting off a flow of at least one low autoignition temperature fuel to a combustion system of the turbine apparatus in response to a detected trip condition during operation of a turbine apparatus. The process can also include venting a fuel delivery system of the combustion system to depressurize the fuel delivery system and feeding a high autoignition temperature fuel to the fuel delivery system to purge the fuel delivery system and subsequently re-pressurize the fuel delivery system to a pre-selected pressure while the at least one low autoignition temperature fuel is positively isolated from the fuel delivery system so no low autoignition temperature fuel can be fed toward the combustion system via the fuel delivery system while the high autoignition temperature fuel is being fed to the fuel delivery system for the purge of the fuel delivery system and subsequent re-pressurization of the fuel delivery system to the pre-selected pressure. The process can also include feeding the high autoignition temperature fuel to the combustion system to facilitate starting (or restarting) operation of the turbine apparatus.

As noted above, the trip condition that can be detected can be any of a number of different conditions that can meet a pre-selected trip condition criteria. Such a trip condition can be based on temperature and/or pressure levels that exceed a pre-selected operational temperature level and/or pre-selected operational pressure level. A pre-defined trip condition can also be detected based on other criteria (e.g. oxygen concentration levels, type of fuel being combusted, high vibration or other mechanical malfunction, etc.). The pre-defined trip condition can also be a normal shutdown of the turbine apparatus (e.g. via operator input that actuates a normal shutdown of operation of the turbine apparatus).

In a tenth aspect, the process can also include feeding the at least one low autoignition temperature fuel to the combustion system after a pre-selected set of criteria is met after the starting (or restarting) of the operation of the turbine apparatus, In an eleventh aspect, the feeding the high autoignition temperature fuel to the combustion system to facilitate starting operation of the turbine apparatus can include adjusting a position of a valve assembly of a combustion system feed conduit from a closed position to an open position.

In a twelfth aspect, the feeding of the high autoignition temperature fuel to the fuel delivery system to purge the fuel delivery system and subsequently re-pressurize the fuel delivery system to the pre-selected pressure while the at least one low autoignition temperature fuel is positively isolated from the fuel delivery system so no low autoignition temperature fuel can be fed toward the combustion system via the fuel delivery system while the high autoignition temperature fuel is being fed to the fuel delivery system for the purge of the fuel delivery system and subsequent re-pressurization of the fuel delivery system to the pre-selected pressure can include adjusting a valve assembly of a high autoignition temperature fuel feed conduit from a closed position to an open position while at least one valve assembly of at least one low autoignition temperature fuel feed conduit is in a closed and isolated position and at least one valve assembly of at least one vent conduit of a conduit arrangement of the fuel delivery system is in an open position for venting of the fuel delivery system upstream of the combustion system and subsequently closing the at least one valve assembly of the at least one vent conduit for re-pressurization of the fuel delivery system upstream of the combustion system via the high autoignition temperature fuel.

In a thirteenth aspect, the high autoignition temperature fuel can be natural gas and the at least one low autoignition temperature fuel can include hydrogen gas.

In a fourteenth aspect the flow of at least one low autoignition temperature fuel can be provided via a conduit arrangement of the fuel delivery system.

In a fifteenth aspect, the shutting off of the flow of the at least one low autoignition temperature fuel to the combustion system of the turbine apparatus can include (i) adjusting a position of a valve assembly of a combustion system feed conduit of the fuel delivery system from an open position to a closed position and/or (ii) adjusting a position of at least one valve assembly of at least one low autoignition temperature fuel feed conduit from an open position to a closed and isolated position.

In a sixteenth aspect, the process can also include feeding inert gas to the combustion system to purge the combustion system after the shutting off of the flow of the at least one low autoignition temperature fuel to the combustion system of the turbine apparatus is performed. In some embodiments, the shutting off of the flow of the at least one low autoignition temperature fuel to the combustion system of the turbine apparatus can include adjusting a position of a valve assembly of a combustion system feed conduit of the fuel delivery system from an open position to a closed position and adjusting a position of at least one valve assembly of at least one low autoignition temperature fuel feed conduit from an open position to a closed and isolated position. The at least one valve assembly of the at least one low autoignition temperature fuel feed conduit can include a valve assembly of a hydrogen feed conduit and/or a valve assembly of a refinery off gas feed conduit in some embodiments.

In a seventeenth aspect, an embodiment of the apparatus for starting up and shutting down a feed of fuel for a turbine apparatus can be provided and configured for performance of an embodiment of the process for starting up and shutting down a feed of fuel for a turbine apparatus.

In an eighteenth aspect, an embodiment of the process of the ninth aspect can include one or more features of the tenth aspect, eleventh aspect, twelfth aspect, thirteen aspect, fourteenth aspect, fifteenth aspect, sixteenth aspect, and/or seventeenth aspect. It should therefore be appreciated that embodiments of the process can also include other features or process steps. Examples of such other features or process steps include features of the exemplary embodiments discussed herein.

It should be appreciated that embodiments of the process and apparatus can utilize various conduit arrangements and process control elements. The embodiments may utilize sensors (e.g., pressure sensors, temperature sensors, flow rate sensors, composition sensors, etc.), controllers, valves, piping, and other process control elements. Some embodiments can utilize an automated process control system and/or a distributed control system (DCS), for example. Various different conduit arrangements and process control systems can be utilized to meet a particular set of design criteria.

Other details, objects, and advantages of our apparatus for starting up and shutting down a feed of fuel for a turbine apparatus system for starting up and shutting down a feed of fuel for a turbine apparatus, process apparatus for starting up and shutting down a feed of fuel for a turbine apparatus, and methods of making and using the same will become apparent as the following description of certain exemplary embodiments thereof proceeds.

BRIEF DESCRIPTION OF THE DRAWINGS

Exemplary embodiments of my process for starting up and shutting down a feed of fuel for a turbine apparatus, apparatus for starting up and shutting down a feed of fuel for a turbine apparatus, a system for starting up and shutting down a feed of fuel for a gas turbine apparatus, and methods of making and using the same are shown in the drawings included herewith. It should be understood that like reference characters used in the drawings may identify like components.

DETAILED DESCRIPTION OF THE INVENTION

Figure 1:
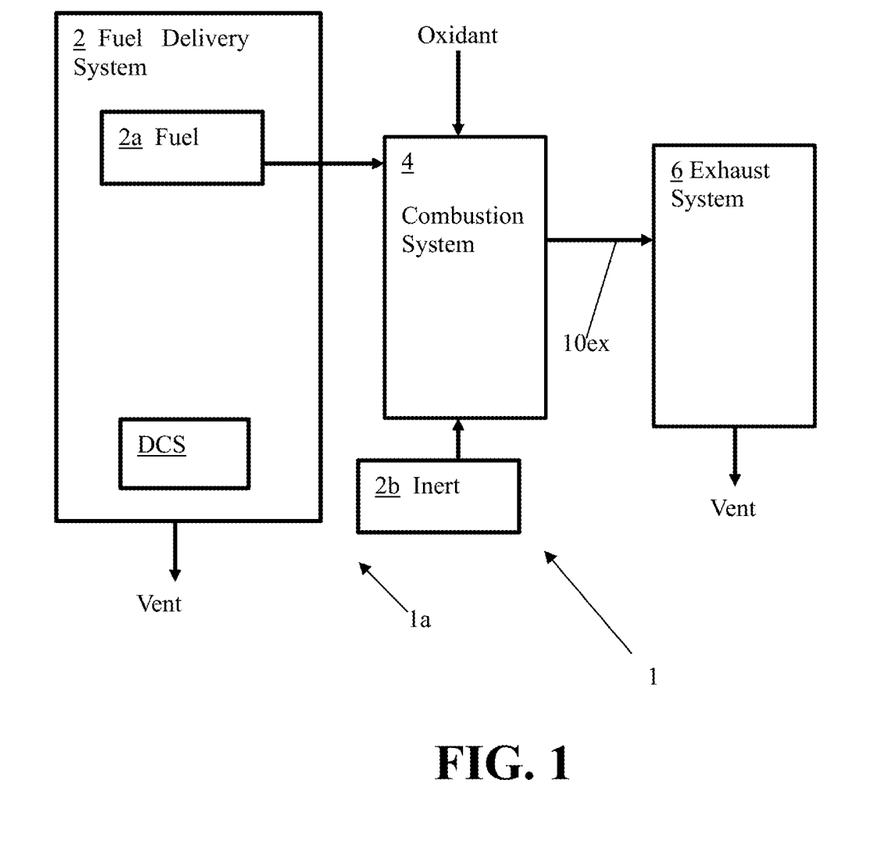
FIG. 1 is a block diagram of a first exemplary embodiment of a gas turbine apparatus 1, which can include an exemplary embodiment of a system for starting up and shutting down a feed of fuel for a turbine apparatus that can utilize an exemplary embodiment of a process for starting up and shutting down a feed of fuel for a turbine apparatus.
Figure 2:
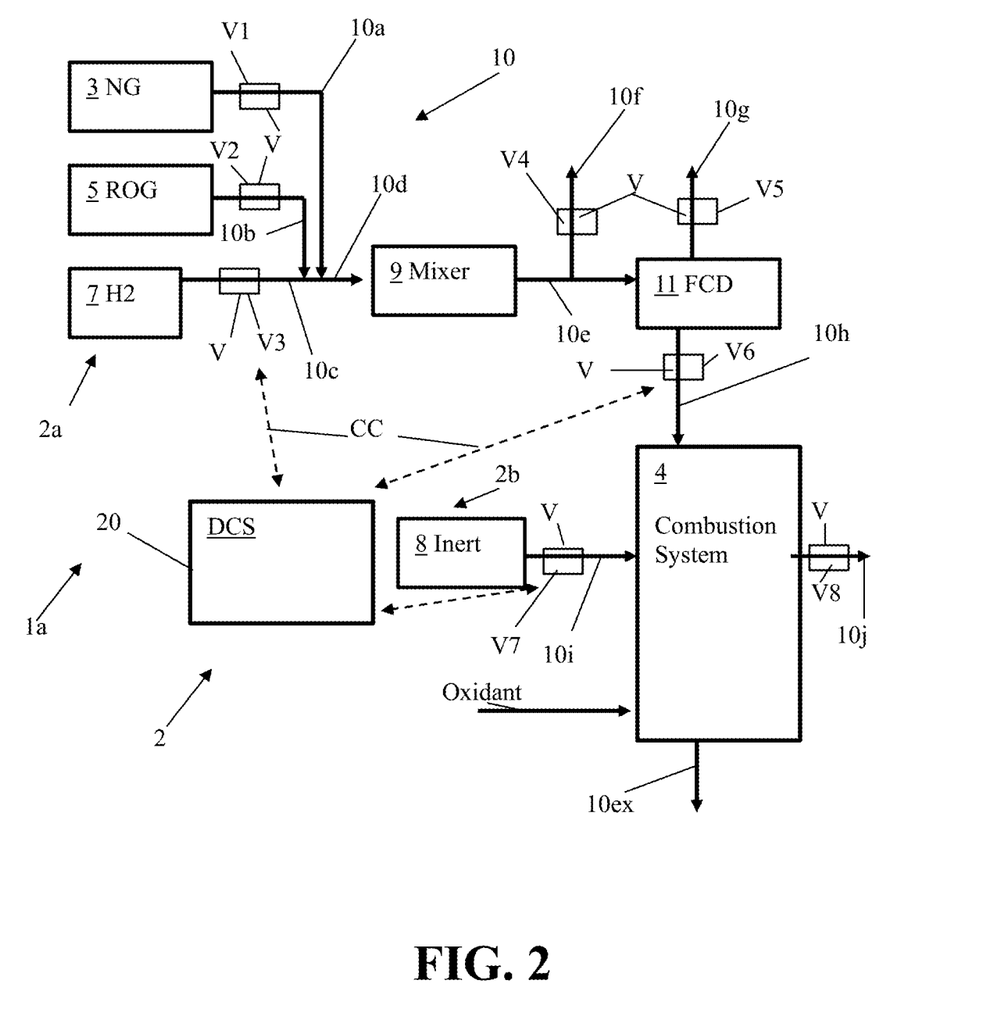
FIG. 2 is a block diagram of a first exemplary embodiment of the system for starting up and shutting down a feed of fuel for a turbine apparatus that can be included in the first exemplary embodiment of a gas turbine apparatus 1. Embodiments of the system can utilize an exemplary embodiment of a process for starting up and shutting down a feed of fuel for the turbine apparatus.
Figure 3:
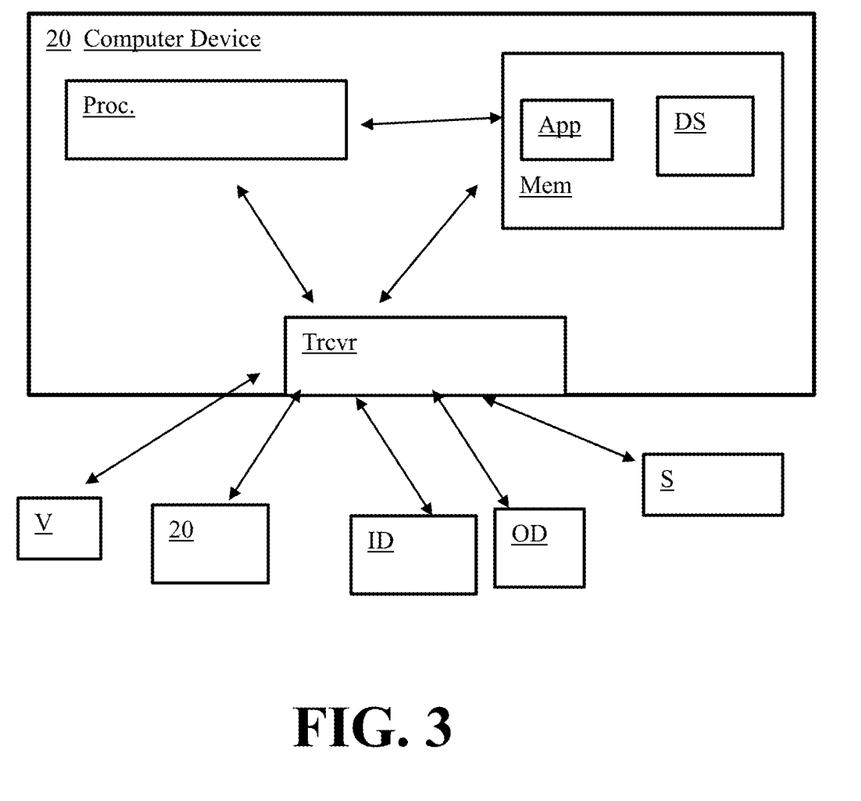
FIG. 3 is a block diagram of an exemplary embodiment of a distributed control system controller (DCS) that can be included in the first exemplary embodiment of the system shown in FIG. 2.

Referring to FIGS. 1-3, apparatus 1a for starting up and shutting down a feed of fuel for a turbine apparatus 1 can include a fuel delivery system 2 configured to provide fuel to a combustion system 4 (e.g. a turbine combustion system, etc.). The combustion system 4 can be connected to at least one source of oxidant (e.g. air, oxygen gas, a combination thereof, etc.) for combusting at least one fuel received from the fuel delivery system 2. The combustion of the fuel can be configured to drive a shaft as the combustion gas formed from combustion of the fuel is output as at least one exhaust stream 10ex that can be fed to an exhaust system 6 connected to the combustion system 4 for being vented to atmosphere.

The fuel delivery system 2 can include multiple sources of fuel 2a that can be connected to the combustion system 4 for being combusted within at least one combustion chamber of the combustion system 4. Also, in some embodiments, the exhaust system 6 may not be utilized and at least one exhaust stream 10ex can be output from the combustion system 4 to atmosphere.

The apparatus 1a for starting up and shutting down a feed of fuel for the turbine apparatus 1 can include the fuel delivery system 2 and a conduit arrangement 10 of this system. The apparatus can also include at least one source of inert fluid (e.g. an inert gas such as, for example, nitrogen). An inert gas of the apparatus for starting up and shutting down a feed of fuel for the turbine apparatus can be configured to help mitigate or avoid combustion by being non-combustively reactive with the fuel (e.g. not including an oxidant). Examples of an inert gas can include dry carbon dioxide, argon, or nitrogen, and/or combinations thereof.

The source of inert gas 2b can be connected to the combustion system 4 so that at least one inert gas stream can be fed to the combustion system 4 to purge the system of fuel to avoid that fuel combusting and/or to mitigate combustion until the combustion process within the combustion chamber of the combustion system 4 can be stopped. In some embodiments, the source of inert gas 2b can include a storage tank configured to store compressed cryogenic liquid (e.g. liquid nitrogen) and an inert gas storage tank or inert gas buffer tank that may be positioned to store inert gas formed via vaporization of this stored liquid for feeding to the combustion system 4. The vaporization of the inert liquid can be provided via an ambient air vaporizer or other type of vaporizer that can be positioned between the cryogenic liquid storage tank and inert gas storage tank or inert gas buffer tank. In other embodiments, it is contemplated that the source of inert gas 2b can only include an inert gas storage tank.

The source of inert gas 2b can be utilized to help resolve detected safety issues that may arise during operation of the turbine apparatus 1. For example, the temperature of the combustion system 4, pressure of the combustion system 4, and/or oxygen levels within the combustion system 4 can be detected as meeting a pre-defined safety threshold that indicates the combustion process could pose a safety issue or result in undesired combustion occurring outside of the combustion chamber of the combustion system 4. In response to such a detection, the feed of fuel fed to the combustion system 4 can be stopped, the feed of oxidant into the combustion system 4 can be stopped, and the combustion system 4 can undergo venting (e.g. via the exhaust system 6 and/or at least one other openable valve that can be opened for venting and closed when purging is not desired) to facilitate purging of the combustion system 4. The fuel delivery system 2 can also undergo purging by having the gas of this system purged via at least one vent conduit (Vent) of the fuel delivery system 2 being opened for venting.

The fuel delivery system 2 can include a distributed control system controller (DCS). The distributed control system controller (DCS) can be a type of computer device 20 that is communicatively connectable to valves V and sensors S of the fuel delivery system 2 and/or conduit arrangement 10 to monitor operations of the fuel delivery system and detect a trip of at least one pre-selected safety threshold to initiate the purging operations. The distributed control system controller (DCS) can also be configured for communication with a controller of the turbine apparatus 1 that can oversee turbine engine operation and/or performance to facilitate restarting of the turbine apparatus 1 after the detected safety condition is determined to have been resolved via the purging. Such actuation of valve adjustment for valve assemblies V for purging and restarting can be facilitated via communicative connections CC the distributed control system controller (DCS) can have with different valves of the conduit arrangement 10, and a controller that can oversee turbine engine operations of the turbine apparatus 1, and other elements.

As may best be appreciated from FIG. 2, the multiple sources of fuel 2a can include natural gas (NG), hydrogen (H2) and refinery off gas (ROG). The natural gas can be considered a type of high autoignition temperature fuel and the hydrogen and refinery off gas (ROG) can be considered different types of low autoignition temperature fuels. These fuels can all be gaseous fuels.

The refinery off gas (ROG) can include a gas that has between 60 mole percent (mol %) hydrogen and 90 mol % hydrogen) and a substantial remaining amount of heavy hydrocarbons (e.g. propane, butane, pentane, hexane, etc.). In some embodiments, the hydrogen can be between 60 mol % and 80 mol % of the refinery off gas and propane can be between 5 mol % and 13 mol % of the refinery off gas, for example. The hydrogen (H2) can be at least 95 mol % hydrogen (e.g. between 95 mol % hydrogen and 100 mol % hydrogen, between 99 mol % hydrogen and 100 mol % hydrogen, etc.). The natural gas (NG) can include methane gas and be comprised mostly of methane (e.g. be between 95 mol % methane and 100 mol % methane, be between 80 mol % methane and 100 mol % methane, etc.).

The fuel delivery system 2 can be connected to a source of natural gas 3. The source of natural gas 3 can be a pipeline through which natural gas can pass and/or be at least one storage vessel that stores the natural gas (e.g. a tank, a storage unit, etc.).

The fuel delivery system 2 can be connected to a source of refinery off gas (ROG) 5. The source of refinery off gas (ROG) 5 can be a pipeline through which refinery off gas (ROG) can pass and/or be at least one storage vessel that stores the refinery off gas (ROG) (e.g. a tank, a storage unit, etc.).

The fuel delivery system 2 can also be connected to a source of hydrogen (H2) 7. The source of hydrogen 7 can be a pipeline through which hydrogen can pass and/or be at least one storage vessel that stores the hydrogen (e.g. a tank, a storage unit, etc.).

The fuel delivery system 2 can include a conduit arrangement 10, which can include a plurality of conduits that are connected to each other as well as multiple valve assemblies V. Each valve assembly V can include a single valve, or at least two valves (e.g. a pressure valve positioned adjacent a positive isolation valve, etc.). Each valve assembly V for the low autoignition fuel feed conduits of the conduit arrangement 10 can include at least one valve that can permit an adjustment of pressure within the fuel delivery system (e.g. include or be a pressure valve) and also permit the sources of low autoignition fuel (e.g. sources of ROG and hydrogen 5 and 7) to be positively isolated from the rest of the fuel delivery system 2 in response to a detected safety condition tripping that to avoid combustion of the fuel from occurring outside of the combustion chamber of the combustion system 4 (e.g. autoignition of the fuel outside of the combustion chamber).

The conduit arrangement 10 can also include a plurality of sensors positioned to detect temperature, pressure, and/or flow rate of different flows passing through the conduit arrangement 10 or other units of the fuel delivery system 2. The valve assemblies V, sensors, and other elements can be communicatively connected to a distributed control system controller (DCS). The controller can be configured to receive data from sensors, communicate with the valve assemblies V to adjust the position of valves of the valve assemblies between their opened and closed positions, and also communicate with at least one operator device via communicative connections CC the distributed control system controller (DCS) can have with those elements. The distributed control system controller (DCS) can help monitor operations and provide automated process control oversight for operations of the fuel delivery system 2 and/or the apparatus 1a for starting up and shutting down a feed of fuel for the turbine apparatus 1.

The fuel delivery system 2 can also include other elements. These elements can include a mixer 9 configured to mix one or more fuels, a fuel cleaning device 11 (FCD). The fuel cleaning device 11 (FCD) can include a filter mechanism that can include a coalescer as well as other filter devices that can be configured to remove particulates and liquid droplets from the fuel so that the fuel output from the fuel cleaning device 11 is a gaseous, purified fuel suitable for being combusted within the combustion chamber of the combustion system 4, for example. The mixer 9 and the fuel cleaning device 11 can be considered elements of the conduit arrangement 10 of the fuel delivery system 2 in some embodiments.

The conduit arrangement 10 can include a natural gas feed conduit 10a that can be connected to a hydrogen fuel feed conduit 10c and/or a mixer feed conduit 10d. The hydrogen fuel feed conduit 10c can be connected to at least one source of hydrogen containing fuel. The hydrogen containing fuel can include a source of hydrogen 7 and/or a source of refinery off gas (ROG) 5. In some embodiments, there may just be a single source of hydrogen fuel (e.g. only a source of hydrogen 7 or a source of refinery off gas 5). In other embodiments, the fuel delivery system can include connections to both a source of hydrogen 7 and a source of refinery off gas (ROG) 5.

For instance, the hydrogen feed conduit 10c can include a conduit connected between the mixer 9 and a source of hydrogen 7 for feeding hydrogen gas to the mixer 9. The hydrogen feed conduit 10c can also be connected to a refinery off gas feed conduit 10b connected between the source of refinery off gas (ROG) 5 and the mixer 9. The refinery off gas feed conduit 10b, hydrogen feed conduit 10c, and natural gas feed conduit 10a can each include a valve assembly V so that only one of these fuels can be fed to the mixer 9, only two of these fuels can be fed to the mixer 9 simultaneously, or (when all three fuel sources are present), all three of the fuels can be fed to the mixer simultaneously. The valve assemblies V can be adjustable so that only a single fuel can be fed to the mixer 9, or a combination of fuels can be fed to the mixer 9 at different times based on different operational conditions.

The natural gas feed conduit 10a can be considered a high autoignition temperature fuel feed conduit connectable to a source of a high autoignition temperature fuel. The hydrogen feed conduit 10c and the refinery off gas feed conduit 10b can be considered low autoignition temperature fuel feed conduits connectable to different sources of low autoignition temperature fuels.

In some embodiments, a mixer feed conduit 10d can be connected to the hydrogen feed conduit 10c, a refinery off gas feed conduit 10b, and natural gas feed conduit 10a so that these fuels can be fed to the mixer 9 for being mixed therein. The mixer 9 can be an in-line mixer, a mixing device, a mixing vessel, or other type of mixer. The mixer 9 can be configured to facilitate mixing of the fuels. The fuel(s) fed to the mixer 9 can all be gaseous for facilitating mixing via the mixer 9, for example. The mixer 9 can output the mixed fuel or single fuel for being fed downstream to the fuel cleaning device 11. A fuel cleaning device feed conduit 10e can be connected between the mixer 9 and the fuel cleaning device 11 for feeding the fuel from the mixer 9 to the fuel cleaning device 11, for example. The fuel cleaning device 11 can remove particulates and liquid from the fuel so that the fuel can be output from the fuel cleaning device 11 in a sufficiently purified condition for being combusted within the combustion chamber of the combustion system 4. The fuel cleaning device 11 can be connected to the combustion system 4 via a combustion system feed conduit 10h connected between the fuel cleaning device 11 and the combustion system 4 so that the fuel output from the fuel cleaning device 11 can be fed to the combustion system 4, for example. The combustion system feed conduit 10h can include a valve assembly V that can be adjusted between open and closed positions to control how much fuel is fed to the combustion system and so that feeding of fuel to the combustion system 4 can also be stopped (e.g. via closing of at least one valve of the combustion system feed conduit 10h valve assembly V).

A mixer vent conduit 10f can be connected to the mixer 9 and/or the fuel cleaning device feed conduit 10e to facilitate venting of at least the mixer 9 in the event mixing is needed. Also (or alternatively), the fuel cleaning device 11 can be connected to a vent conduit 10g for venting of the mixer 9 and/or fuel cleaning device 11. Such venting can also vent the conduits of the conduit arrangement 10 that are upstream of the combustion system feed conduit valve assembly.

The combustion system 4 can be connected to a source of oxidant to receive at least one stream of oxidant (Oxidant). The oxidant can include, for example, air, and can be fed into the combustion chamber of the combustion system 4 via a compressor or fan that is in fluid communication with an air-intake conduit of the combustion system 4, for example. The oxidant can be fed into the combustion chamber for facilitating combustion of the fuel via the presence of oxygen with the oxidant.

The fuel delivery system 2 can also include at least one source of inert fluid 2b, which can include, for example, at least one source of an inert gas 8. The inert gas can be gas formed from the vaporization of stored liquid nitrogen, stored liquid argon, or dry carbon dioxide, for example. As noted above, the inert gas can be inert (e.g. nitrogen or argon) or can be a gas that is non-combustively reactive with the fuel (e.g. does not include oxygen gas). The source of the inert fluid be connected to the combustion system 4 via at least one inert fluid connection conduit 10i of the conduit arrangement 10. Each inert fluid connection conduit 10i can include at least one valve assembly V that is adjustable between open and closed positions so that the inert fluid can be fed to the combustion system 4 when the valve assembly V is in the opened position and no inert fluid is fed to the combustion system 4 when the valve assembly V is in its closed position.

The inert fluid can be fed as inert gas to at least the combustion chamber of the combustion system or at least an upstream portion of the combustion system 4 that is downstream of the valve assembly V of the combustion system feed conduit 10h. In some embodiments, there may only be a single feed of inert fluid to the combustion system 4 for injection of inert fluid at a position that is downstream of the valve assembly V of the combustion system feed conduit 10h and upstream of the combustion chamber of the combustion system 4 and/or at the combustion chamber. In other embodiments there can be two or more feeds of inert fluid (e.g. inert gas such as nitrogen gas) fed to the combustion system 4 via the inert fluid connection conduit 10i so that a first inert gas stream can be fed to the combustion system 4 for injection of inert fluid at a position that is downstream of the valve assembly V of the combustion system feed conduit 10h and upstream of the combustion chamber of the combustion system 4 and a second inert gas stream that can be fed to the combustion chamber of the combustion system 4. The combustion system 4 can also be connected to at least one purge conduit 10j to facilitate venting of the combustion system 4 and/or purging of the combustion system 4. Alternatively, it is contemplated that the venting of the combustion system 4 may just be provided via use of the conduit(s) for the at least one exhaust stream 10ex that can be output from the turbine combustion chamber of the combustion system 4. In embodiments that include at least one purge conduit 10j, each purge conduit 10j can include a valve assembly V that can be adjustable between an opened position for venting and/or purging and a closed position that encloses the combustion chamber so one or more exhaust streams 10ex are output for passing to the atmosphere either directly via at least one exhaust conduit and/or via an exhaust system 6.

As may best be seen from FIG. 3, the distributed control system controller (DCS) can be a computer device 20 that can include a processor (Proc.) that is communicatively connected to at least one transceiver (Trcvr) and at least one non-transitory computer readable medium (Mem), which can be a solid state drive, flash drive, hard drive, or other type of non-transitory memory. The transceiver can include one or more communicative interfaces, such as at least one network transceiver, at least one near field communication transceiver and/or at least one wireless transceiver. The transceiver (Trcvr) can be configured to facilitate communicative connections the computer device 20 can have to other computer devices 10, input devices (ID), output devices (OD), valves (V) of the fuel delivery system 2 and/or apparatus 1a for starting up and shutting down a feed of fuel for the turbine apparatus and/or sensors(S) of the apparatus 1a for starting up and shutting down a feed of fuel for the turbine apparatus and/or fuel delivery system 2. The non-transitory computer readable medium (Mem) can have one or more applications (App) stored thereon as well as one or more data stores (DS), such as files, databases, or other types of data stores. Code of an application can be run by the processor (Proc.) to cause the computer device 20 to perform various actions and/or processes. Running of the code of an application can also result in use of one or more data stores (DS) during the running of the application (App).

The one or more input devices (ID) can include a keyboard, key pad, pointer device, touch screen, microphone, or other type of input device that can be communicatively connected to the processor or the computer device 20. The one or more output devices (OD) can include a speaker, display, printer, or other type of output device that can be communicatively connected to the processor or the computer device 20. The other computer devices 20 can be communicatively connectable to the computer device 20 via a network connection (e.g. local area network connection, wide area network connection, cellular network connection, internet connection, etc.). The communicative connections between computer devices 20 (e.g. between the distributed control system controller (DCS) and an operator device (e.g. laptop computer, desktop computer, etc.) and/or turbine apparatus engine controller can involve intermediate devices such as border control devices, access points, or other types of intermediate nodes between the communicatively connected computer devices 20.

Figure 4:
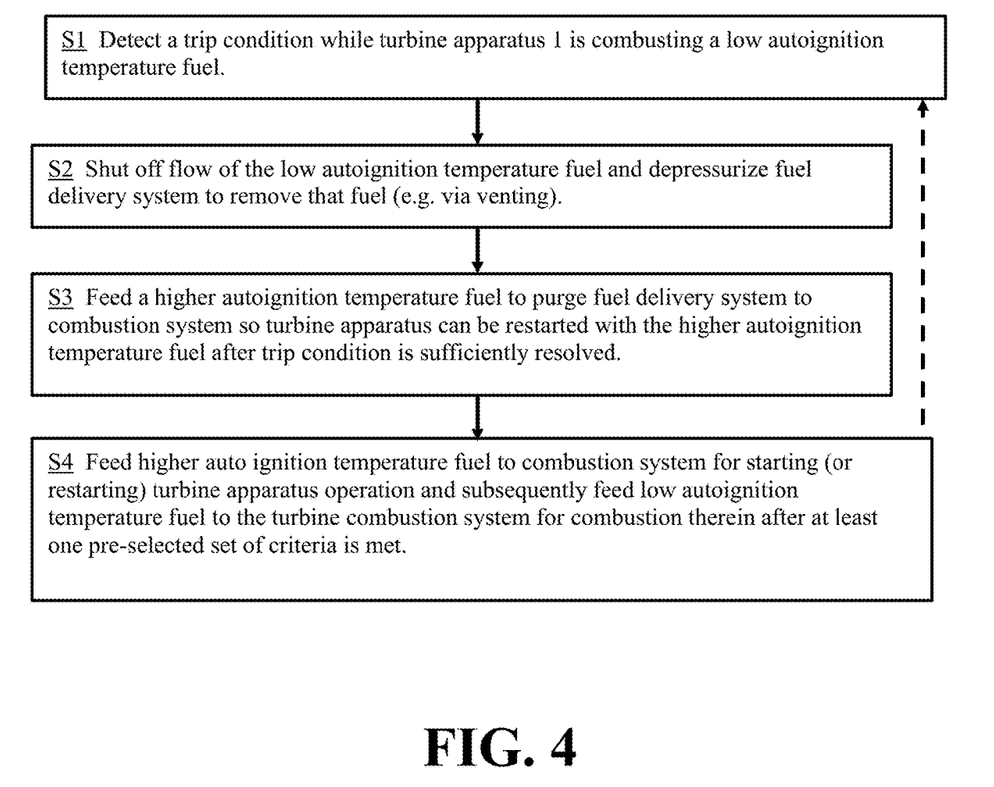
FIG. 4 is a flow chart illustrating a first exemplary embodiment of a process for starting up and shutting down a feed of fuel for a turbine apparatus.

An exemplary embodiment of a process for operation and control of the fuel delivery system 2 and/or process for starting up and shutting down a feed of fuel for the turbine apparatus and an exemplary embodiment of a process for restarting a feed of fuel for turbine apparatus operations may best be appreciated from FIGS. 2 and 4. For example, in one embodiment of a process, a first step S1 can include detection of a trip condition while the turbine is combusting a low autoignition temperature fuel (e.g. refinery off gas or hydrogen). The detected trip condition could be due to an identified safety issue based on sensor data indicating that a per-selected set of one or more criteria for a shutdown of the turbine apparatus 1 has been met. The detected trip condition can also be a normal shutdown condition that can be based on a pre-selected set of criteria and/or operator input to have the operation of the turbine apparatus 1 shutdown. The detected trip condition can also be other conditions based on a pre-selected set of criteria. Examples of other trip conditions can include, for example, vibration exceeding a pre-selected threshold.

In a second step S2, the flow of the low autoignition temperature fuel can be stopped so that fuel is no longer being output form source(s) of the fuel for feeding to the combustion system 4. The stopping of this flow of fuel can include adjustment of the valve V6 of the combustion system feed conduit 10h being moved to a closed position to stop the flow of fuel toward the combustion system 4 and can also include adjusting the valve assembly V2 of the refinery off gas feed conduit 10b and/or the valve assembly V3 of the hydrogen feed conduit 10c from their open position to a closed position to prevent the flow of that low autoignition temperature fuel out from the source(s) of the fuel and to positively isolate the fuel from the combustion system 4. In the event the fuel being fed to the combustion system also includes natural gas, the valve assembly V1 of the natural gas feed conduit 10a can also be closed to shut off the flow of fuel. In situations where the natural gas fuel was not already being fed to the combustion system, this valve assembly V1 may have already been in a closed position and would therefore just remain closed.

The feed of oxidant into the combustion system 4 can also be stopped in response to the detected trip condition. For example, a fan or compressor that may be run to facilitate a flow of air or other oxidant into the combustion system's combustion chamber can be stopped to stop the feeding of oxidant into the combustion system 4 in response to the detected trip condition. In some configurations, the combustion system 4 can include a compressor section that can be directly connected to an exhaust section for facilitating the feed of oxidant into the combustion chamber of the combustion system 4. The distributed control system controller (DCS) can be configured to communicate with a controller of the turbine apparatus 1 that may oversee operation of the combustion system 4 to facilitate the cessation of operation in response to the detected trip condition, for example. In some embodiments, cessation can be provided in conjunction with a communication received from a controller of the turbine apparatus 1 or a motor of the turbine apparatus 1 that provides data indicating the turbine apparatus 1 is to cease operation for example. Cessation of operations of the turbine apparatus 1 can result in the turbine apparatus rolling to a stop, or having its shaft cease rotation in some embodiments, for example.

In this second step S2, the fuel delivery system can also be vented to remove the fuel from the conduit arrangement 10, and other elements (e.g. mixer 9, fuel cleaning device 11, etc.) that can be upstream of the valve assembly V6 of the combustion system feed conduit 10h. The venting can depressurize the fuel delivery system 2 by depressurizing the conduit arrangement 10, mixer 9 and/or fuel cleaning device 11 upstream of the valve assembly V6 of the combustion system feed conduit 10h after that valve assembly is closed. Such venting can be facilitated by adjustment of the valve assembly V4 of the mixer vent conduit 10f being adjusted from its closed position to its open position and/or adjustment of the valve assembly V5 of the fuel cleaning device vent conduit 10g from its closed position to its open position. This venting can be a vent to flare so that the vented fuel is combusted via a flare for emitting venting to atmosphere. The fuel within the conduit arrangement 10 upstream of the closed valve assembly V6 of the combustion system feed conduit 10h can be passed to atmosphere via such venting, which can also depressurize the conduit arrangement 10 and other elements (e.g. mixer 9 and fuel cleaning device 11) upstream of the closed valve assembly V6 of the combustion system feed conduit 10h.

While the fuel delivery system 2 is being depressurized and vented in response to the detected trip condition, the combustion system 4 can also undergo venting via its exhaust stream 10ex being exposed to atmosphere. Such venting can also be expedited via adjustment of the valve assembly V8 of the at least one purge conduit 10j that can help speed up the depressurization process for the combustion system 4. When valve assembly V8 and purge conduit 10j is utilized, venting of fuel can be provided so that the fluid is vented to a flare to facilitate venting.

The venting and depressurization of the fuel delivery system 2 and combustion system 4 can help remove uncombusted fuel from the turbine apparatus 1 (e.g. fuel within the turbine apparatus 1 that was not combusted) to facilitate a safe shutdown of the turbine apparatus 1 and/or avoid a detected unsafe condition that caused a trip condition. The removal of the uncombusted fuel can be performed to help ensure safety by helping avoid a possible autoignition event could occur so that this autoignition danger can be avoided. This can also facilitate a decrease in temperature and pressure that can further alleviate such an issue. In some embodiments, the venting and/or depressurization can occur for a pre-selected vent time period to provide sufficient venting to resolve the detected condition or otherwise help ensure safety.

After the venting has been performed for at least the pre-selected vent time period, the valve assembly V8 of the at least one purge conduit 10j can be moved back to its closed position (e.g. via communications between the distributed control system controller (DCS) and the valve assembly). Also, the valve assembly V4 of the mixer vent conduit 10f can be adjusted from its open position to its closed position and/or the valve assembly V5 of the fuel cleaning device vent conduit 10g can be adjusted from its open position to its close position to cease venting and depressurization operations and permit the fuel delivery system 2 and combustion system 4 to be repressurized for restarting operations of the turbine apparatus 1 via combustion of fuel within the combustion system 4.

Before or after the valve assembly V8 of the at least one purge conduit 10j is returned to its closed position, inert gas from a source of inert gas 8 (Inert) can be fed to the combustion system 4 to purge the system and help ensure that the fuel present therein during the detected trip condition that posed a possible safety issue is removed to help facilitate an effective and safe restarting of the combustion system 4. The inert gas can be fed to the combustion system 4 via adjustment of the valve assembly V7 of the inert fluid connection conduit 10i so that this valve assembly V7 is adjusted from its closed position to its open position so that inert gas can be passed from the source of inert gas 8 to the combustion system 4 via the inert fluid connection conduit 10i for being passed into the combustion system 4 to remove any residual fuel that may be within the combustion system 4. The inert purge gas can be output via the at least one exhaust conduit connected to the combustion chamber of the combustion system 4.

The inert gas utilized for the purging can be positioned and arranged so it is only fed to the combustion system 4 and not the upstream fuel delivery system 2. This can help limit the amount of inert gas needed to perform purging. In some embodiments, the type of configuration and reduce the inert fluid storage capacity for use in this type of safety operation situation by 50% to 70%. For example, in some embodiments, only 5 kg to 7 kg of inert fluid may need to be stored to provide sufficient purging instead of 25 kg of inert fluid that would have been needed if the inert gas was to be used for purging of also the upstream fuel delivery system elements. The overall mass reduction of needed inert gas can vary depending on sizing of the turbine apparatus 1 and other operational requirements. This non-limiting example for inert gas storage reductions is provided herewith to help illustrate the substantial storage reduction that can be provided by some embodiments of our apparatus 1a for starting up and shutting down a feed of fuel for the turbine apparatus 1, fuel delivery system 2, and process.

Instead of utilizing inert gas for the purging of the fuel delivery system 2, a higher autoignition temperature fuel can be utilized to perform purging and re-pressurization of the fuel delivery system 2 upstream of the combustion system 4. This can occur while the valve assembly V6 of the combustion system feed conduit 10h is still in its closed position and/or while the inert gas from the source of inert gas 8 is being fed into the combustion system 4 for purging.

For example, hydrogen gas can have an autoignition temperature of about 800° F. (426.7° C.). Refinery off gas (ROG) can also have a low autoignition temperature of around 800° F. to 850° F. (426.7° C. to 454.4° C.) depending on the mix of fuel within that gas. A low autoignition temperature can be a temperature that is at or significantly below 500° C. and can include an autoignition temperature in the 400° C. to 450° C. range in some embodiments. In contrast, a high autoignition temperature can be a temperature that is substantially greater than a low autoignition temperature and can be a temperature that is at least about 1000° F. (537.7° C.), in a range of 530° C. to 600° C. or is a temperature that is greater than 535° C. Natural gas from the source of natural gas 3 is an example of a fuel having a high autoignition temperature as compared to hydrogen or refinery off gas, for instance.

Therefore, in a third step S3, the fuel delivery system 2 can undergo purging and subsequently undergo an increase in the pressure of the fuel delivery system 2 to a pre-selected operational pressure (e.g. a pressure of 40 bar (4 MPa), a pressure in a range of 35 bar to 45 bar (3.5 MPa to 4.5 MPa), or other suitable operational pressure range for re-pressurization by feeding natural gas from the source of natural gas 3 to the mixer 9, fuel cleaning device 11, and conduit arrangement 10 upstream of the closed valve assembly V6 of the combustion system feed conduit 10h. This feeding of natural gas can be provided via adjustment of the valve assembly V1 of the natural gas feed conduit 10a from a closed position to an open position while the valve assembly V2 of the refinery off gas feed conduit 10b and valve assembly V3 of the hydrogen fuel feed conduit 10c are in their closed, isolated position. Of course, in embodiments that may only have a source of hydrogen 7 or a source of refinery off gas 5, then only one of these valve assemblies may be kept in its closed position while the valve assembly of the natural gas feed conduit 10a is opened to perform purging via a higher autoignition temperature fuel.

After the opening of the valve assembly V1 of the natural gas feed conduit 10a, the natural gas from the source of natural gas can be fed into the fuel delivery system 2 to help purge the conduit arrangement 10 upstream of the closed valve V6 of the combustion system feed conduit 10h. During at least the initial purging provided via the feeding of natural gas, one or more of the conduit arrangement vent conduits can be opened by keeping the valve assembly V4 of the mixer vent conduit 10f and/or valve assembly V5 of the vent conduit 10g opened for at least a portion of the time the natural gas purging is provided so that the natural gas purge is able to help expel the low autoignition temperature fuel from the conduit arrangement 10, mixer 9, and/or fuel cleaning device 11 upstream of the valve assembly V6 of the combustion system feed conduit 10h.

For re-pressurization of the conduit arrangement 10, these one or more vent conduit valve assemblies V4 and/or V5 can be closed so that the natural gas being fed into the conduit arrangement 10 via the source of natural gas 3 can re-pressurize the conduit arrangement to the pre-selected operational pressure (e.g. a pressure within a range of 2 MPa and 5 MPa or other suitable operational pressure range). It should be appreciated that this type of higher autoignition temperature fuel feeding that can be performed for purging and re-pressurization in the third step S3 can be performed after the detected trip condition has been sufficiently resolved via venting.

The use of natural gas or other higher autoignition temperature fuel for purging in the fuel delivery system 2 can help facilitate a quicker restart operation of the turbine apparatus 1. For example, we have found that some embodiments can permit turbine operations to be restarted at least 20-30 minutes faster (e.g. providing a 30% to 70% reduction in time needed for a restart operation) by avoiding use of a slower inert gas purge and permitting a fuel to more quickly repressurize the conduit arrangement 10 while also permitting that fuel to be more quickly available for feeding to the combustion system 4 for restarting of the turbine apparatus (e.g. no removal of an inert gas purge from the conduit arrangement 10 is needed and no further delay associated with inert gas removal can be incurred, etc.). Also, in the event that re-starting of the turbine apparatus 1 results in a false start type issue, no secondary purging of an inert gas can be needed because the higher autoignition temperature fuel can be available and used for the restarting of operations and can provide an improved safety factor to help avoid such issues due to its higher autoignition temperature. We determined that the improved safety factor that can be provided by use of the higher autoignition temperature fuel having a higher autoignition temperature at startup, or re-start of the turbine apparatus 1 can help avoid such inert gas purge needs due to the improved safety factor tolerance the higher autoignition temperature can provide at startup (or re-start), for example.

In a fourth step S4, the turbine apparatus operation can be started (or re-started) after it has undergone sufficient venting and purging to resolve the detected safety condition that triggered the detected trip condition. To facilitate such restarting, the valve assembly V6 of the combustion system feed conduit 10h can be adjusted from its closed position to an open position so that the natural gas within the conduit arrangement 10 fed via the source of natural gas 3 can be fed into the combustion chamber of the combustion system 4 for being combusted therein. The flow of oxidant fed into the combustion system can also be re-started (e.g. via restarting the turbine apparatus 1 for having air flow fed into the turbine apparatus via the compression section of the combustion system 4, etc.). Combustion of the fuel (e.g. natural gas) can then be initiated to resume operations of the turbine apparatus 1. After a sufficient time has passed and/or other criteria is met for indicating the combustion system 4 can resume combusting a low autoignition temperature fuel, the valve assembly V2 of the refinery off gas feed conduit 10b can be adjusted from its closed and isolated position to an open position and/or valve assembly V3 of the hydrogen feed conduit 10c can be adjusted from its closed and isolated position to an open position to feed that fuel (e.g. hydrogen and/or refinery off gas) to the combustion system 4. In such a situation, the valve assembly V1 of the natural gas feed conduit 10a can be closed or otherwise adjusted to facilitate the feed of a desired mixture of fuel to the combustion system 4 for combustion of the fuel therein for turbine apparatus operation.

The turbine apparatus 1 can then resume operations using the low autoignition temperature fuel for combustion until another trip condition is detected as indicated via the broken line arrow in FIG. 4. The process for detection of the trip condition and responsive actions taken to resolve the detected trip condition can then be re-initiated and re-performed to resolve that newly detected condition.

It should be appreciated that the trip condition that can be detected can be based on temperature, pressure, and/or oxygen concentration or oxygen availability within the turbine apparatus or combustion chamber of the combustion system 4. The trip condition can also be based on other criteria in addition, or as an alternative, to one or more of these factors.

It should also be appreciated that actuation of different valve assemblies V to adjust their positions between closed and open positions for steps S1 through S4 of the process can be actuated via communicative connections CC valves of the valve assemblies have with the distributed control system controller (DCS) in some embodiments. The distributed control system controller (DCS) can be configured to provide communications for actuation of such adjustment based on data received from one or more sensors S or other elements in accordance with a pre-defined automated control process defined in code of an application (App) of the memory (Mem) of the distributed control system controller (DCS) for example. The distributed control system controller (DCS) can also provide such communications in response to input provided by an operator device 20 that can be communicatively connected to the distributed control system controller (DCS) as well, or in accordance with the pre-defined automated control process. The operator device 20 can be a computer device used by an operator to help monitor and/or control operations of the turbine apparatus 1 or fuel generation processing that can be performed upstream of the fuel delivery system 2, for example.

As noted above, the turbine apparatus 1 and the apparatus 1a for starting up and shutting down a feed of fuel for the turbine apparatus can be configured for operation at a pre-selected operational pressure. This pre-selected operational pressure can be a suitable pressure selected to account for the size of the turbine apparatus, fuel to be combusted therein, and other design criteria. Operational temperatures within a pre-selected temperature range can also be selected based on the types of fuel to be combusted, size of the turbine apparatus 1, and other design criteria. The pre-defined trip condition can be based on temperature and/or pressure levels that exceed the pre-selected operational temperature and/or pressure levels. The pre-defined trip condition can also be detected based on other criteria (e.g. oxygen concentration levels, type of fuel being combusted, high vibration or other mechanical malfunction, etc.).

As noted above, embodiments of our process, system, and apparatus can be configured and implemented so that natural gas or other higher autoignition temperature fuel for purging in the fuel delivery system 2 can help facilitate a quicker restart operation of the turbine apparatus 1 that can also help better mitigate issues associated with false starts that could arise during the restarting of the turbine apparatus 1. Additionally, embodiments can facilitate a significant reduction in the amount of stored inert fluid needed to support safe operation of the turbine apparatus (e.g. provide a reduction of between 30% and 70% in some embodiments as noted above). These types of improvements can facilitate improved turbine operation, more efficient performance that can be provided by reduced downtime in turbine apparatus operations, and also facilitate increased use of low autoignition temperature fuel sources that may be available from green production (e.g. use of green hydrogen produced from electrolysis of water powered by renewable energy, etc.).

Embodiments of our process, apparatus, and system can be adapted for different turbine apparatus design criteria. For example, it should be appreciated that other embodiments can utilize additional venting conduits for venting of the conduit arrangement 10 and/or combustion system 4. It should also be appreciated that other modifications can also be made to meet a particular set of criteria for different embodiments of the turbine apparatus 1 or fuel delivery system 2.

It should therefore be appreciated that modifications to the embodiments explicitly shown and discussed herein can be made to meet a particular set of design objectives or a particular set of design criteria. For instance, the arrangement of valves, piping, and other conduit elements (e.g., conduit connection mechanisms, tubing, seals, valves, etc.) for interconnecting different units of the apparatus for fluid communication of the flows of fluid between different elements (e.g., pumps, valves, conduits, compressors, etc.) can be arranged to meet a particular plant layout design that accounts for available area of the apparatus, sized equipment of the apparatus, and other design considerations. As another example, the flow rate, pressure, and temperature of the fluid passed through the various apparatus or system elements can vary to account for different design configurations and other design criteria. As yet another example, each valve assembly V can include a pressure valve, an electric solenoid valve and/or an isolation valve in the assembly. When more than one valve is included in the valve assembly V, the valves can be arranged in series with each other to permit pressure adjustment, flow adjustment, and/or positive isolation to meet a particular set of design criteria, for example.

Embodiments of the apparatus 1a for starting up and shutting down a feed of fuel for the turbine apparatus, process for starting up and shutting down a feed of fuel for the turbine apparatus, and/or system for starting up and shutting down a feed of fuel for the turbine apparatus can each be configured to include process control elements positioned and configured to monitor and control operations (e.g., temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.). It should be appreciated that embodiments can utilize a distributed control system (DCS) for implementation of one or more processes and/or controlling operations of an apparatus as well.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the process, apparatus, system, and methods of making and using the same have been shown and described above, it is to be distinctly understood that the invention is not limited thereto but may be otherwise variously embodied and practiced within the scope of the following claims.

The invention claimed is:
1. An apparatus for starting up and shutting down a feed of fuel for a turbine apparatus, comprising:
 a conduit arrangement having at least one low autoignition temperature fuel feed conduit connectable to at least one source of a low autoignition temperature fuel and a high autoignition temperature fuel feed conduit connectable to a source of a high autoignition temperature fuel;
 the conduit arrangement being connectable to a combustion system and configured such that in response to a detected trip condition, at least one valve assembly of at least one vent conduit of the conduit arrangement is adjustable to an open position for venting while at least one valve assembly of the at least one low autoignition temperature fuel feed conduit is in a closed position to isolate the at least one source of the low autoignition temperature fuel and at least one valve assembly of the high autoignition temperature fuel feed conduit is also in a closed position to vent the conduit arrangement and the at least one valve assembly of the high autoignition temperature fuel feed conduit is openable while the at least one valve assembly of the at least one low autoignition temperature fuel feed conduit is maintained in the closed position to purge the conduit arrangement upstream of the combustion system and re-pressurize the conduit arrangement with the high autoignition temperature fuel to facilitate restarting of the turbine apparatus;
 wherein the low autoignition temperature fuel has an autoignition temperature less than or equal to 500° C. and the high autoignition temperature fuel has an autoignition temperature greater than 535° C.

2. The apparatus of claim 1, wherein the conduit arrangement includes:
 a mixer and a fuel cleaning device, the mixer being positioned between the fuel cleaning device and the at least one low autoignition temperature fuel feed conduit and the mixer also being positioned between the fuel cleaning device and the high autoignition temperature fuel feed conduit;
 the conduit arrangement including a fuel cleaning device feed conduit positioned between the mixer and the fuel cleaning device and a combustion system feed conduit connected between the fuel cleaning device and the combustion system.

3. The apparatus of claim 2, wherein the conduit arrangement also includes a valve assembly of the combustion system feed conduit that is adjustable to a closed position in response to the detected trip condition.

4. The apparatus of claim 3, comprising:
 a distributed control system controller communicatively connectable to the valve assembly of the combustion system feed conduit, the at least one valve assembly of at least one vent conduit, the at least one valve assembly of the at least one low autoignition temperature fuel feed conduit and the at least one valve assembly of the high autoignition temperature fuel feed conduit.

5. The apparatus of claim 4 comprising:
 a source of inert fluid connectable to the combustion system via at least one inert fluid connection conduit positioned between the combustion system and the source of the inert fluid.

6. The apparatus of claim 5, wherein the source of inert fluid comprises at least one storage tank positioned to retain a fluid comprised of nitrogen.

7. The apparatus of claim 5, wherein the at least one inert fluid connection conduit has at least one valve assembly.

8. The apparatus of claim 7, wherein the at least one inert fluid connection conduit is configured to feed a gas that is non-combustively reactive to a combustion chamber of the combustion system.

9. The apparatus of claim 1, wherein the at least one source of low autoignition temperature fuel comprises a source of hydrogen and a source of refinery off gas (ROG) and the at least one low autoignition temperature fuel feed conduit comprises a hydrogen feed conduit connectable to the source of hydrogen and a ROG feed conduit connectable to the source of ROG; and wherein the at least one valve assembly of the at least one low autoignition temperature fuel feed conduit comprises:
a valve assembly of the hydrogen feed conduit and a valve assembly of the ROG feed conduit.

10. A process for starting up and shutting down a feed of fuel for a turbine apparatus, the process comprising:
in response to a detected trip condition during operation of a turbine apparatus, shutting off a flow of at least one low autoignition temperature fuel to a combustion system of the turbine apparatus;
venting a fuel delivery system of the combustion system to depressurize the fuel delivery system;
feeding a high autoignition temperature fuel to the fuel delivery system to purge the fuel delivery system and subsequently re-pressurize the fuel delivery system to a pre-selected pressure while the at least one low autoignition temperature fuel is positively isolated from the fuel delivery system so no low autoignition temperature fuel can be fed toward the combustion system via the fuel delivery system while the high autoignition temperature fuel is being fed to the fuel delivery system for the purge of the fuel delivery system and subsequent re-pressurization of the fuel delivery system to the pre-selected pressure;
feeding the high autoignition temperature fuel to the combustion system to facilitate starting operation of the turbine apparatus;
wherein the low autoignition temperature fuel has an autoignition temperature less than or equal to 500° C. and the high autoignition temperature fuel has an autoignition temperature greater than 535° C.

11. The process of claim 10, comprising:
after a pre-selected set of criteria is met after the starting of the operation of the turbine apparatus, feeding the at least one low autoignition temperature fuel to the combustion system.

12. The process of claim 10, wherein the feeding of the high autoignition temperature fuel to the combustion system to facilitate starting operation of the turbine apparatus comprises adjusting a position of a valve assembly of a combustion system feed conduit from a closed position to an open position.

13. The process of claim 12, wherein the feeding of the high autoignition temperature fuel to the fuel delivery system to purge the fuel delivery system and subsequently re-pressurize the fuel delivery system to the pre-selected pressure while the at least one low autoignition temperature fuel is positively isolated from the fuel delivery system so no low autoignition temperature fuel can be fed toward the combustion system via the fuel delivery system while the high autoignition temperature fuel is being fed to the fuel delivery system for the purge of the fuel delivery system and subsequent re-pressurization of the fuel delivery system to the pre-selected pressure comprises:
adjusting a valve assembly of a high autoignition temperature fuel feed conduit from a closed position to an open position while at least one valve assembly of at least one low autoignition temperature fuel feed conduit is in a closed and isolated position and at least one valve assembly of at least one vent conduit of a conduit arrangement of the fuel delivery system is in an open position for venting of the fuel delivery system upstream of the combustion system and subsequently closing the at least one valve assembly of the at least one vent conduit for re-pressurization of the fuel delivery system upstream of the combustion system via the high autoignition temperature fuel.

14. The process of claim 13, wherein the high autoignition temperature fuel is natural gas and the at least one low autoignition temperature fuel includes hydrogen gas.

15. The process of claim 14, wherein the flow of at least one low autoignition temperature fuel is provided via a conduit arrangement of the fuel delivery system.

16. The process of claim 10, wherein the shutting off of the flow of the at least one low autoignition temperature fuel to the combustion system of the turbine apparatus comprises:
adjusting a position of a valve assembly of a combustion system feed conduit of the fuel delivery system from an open position to a closed position; and/or
adjusting a position of at least one valve assembly of at least one low autoignition temperature fuel feed conduit from an open position to a closed and isolated position.

17. The process of claim 16, comprising:
feeding inert gas to the combustion system to purge the combustion system after the shutting off of the flow of the at least one low autoignition temperature fuel to the combustion system of the turbine apparatus is performed.

18. The process of claim 10, wherein the shutting off of the flow of the at least one low autoignition temperature fuel to the combustion system of the turbine apparatus comprises:
adjusting a position of a valve assembly of a combustion system feed conduit of the fuel delivery system from an open position to a closed position; and
adjusting a position of at least one valve assembly of at least one low autoignition temperature fuel feed conduit from an open position to a closed and isolated position.

19. The process of claim 18, wherein the at least one valve assembly of the at least one low autoignition temperature fuel feed conduit comprises:
a valve assembly of a hydrogen feed conduit.

20. The process of claim 18, wherein the at least one valve assembly of the at least one low autoignition temperature fuel feed conduit comprises:
a valve assembly of a hydrogen feed conduit and a valve assembly of a refinery off gas feed conduit.

* * * * *